(12) United States Patent
Kim (10) Patent No.: US 11,198,479 B2
(45) Date of Patent: Dec. 14, 2021

(54) DEPRESSION OPERATED TILTING PUMP APPARATUS AND CAB TILTING SYSTEM EMPLOYING THE PUMP APPARATUS

(71) Applicants: HYUNDAI MOTOR COMPANY, Seoul (KR); KIA MOTORS CORPORATION, Seoul (KR)

(72) Inventor: Young-Shin Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 160 days.

(21) Appl. No.: 16/690,309

(22) Filed: Nov. 21, 2019

(65) Prior Publication Data

US 2020/0269935 A1    Aug. 27, 2020

(30) Foreign Application Priority Data

Feb. 25, 2019  (KR) ........................ 10-2019-0021944

(51) Int. Cl.
  *B62D 33/067*  (2006.01)
  *B62D 25/18*   (2006.01)
  *F15B 15/16*   (2006.01)
  *F15B 15/14*   (2006.01)

(52) U.S. Cl.
  CPC ......... *B62D 33/067* (2013.01); *B62D 25/182* (2013.01); *F15B 15/1447* (2013.01); *F15B 15/1457* (2013.01); *F15B 15/16* (2013.01)

(58) Field of Classification Search
  CPC .... B62D 33/063; B62D 33/067; B62D 33/07; B62D 33/071; B62D 25/182; B62D 25/16; F15B 15/16; F15B 15/1447; F15B 15/1457; B60Y 2400/406
  See application file for complete search history.

(56) References Cited

U.S. PATENT DOCUMENTS

| 3,787,087 A * | 1/1974 | Buys ...................... B62D 33/07 |
| | | 296/190.05 |
| 4,411,332 A * | 10/1983 | Eichelsheim ........ B62D 33/071 |
| | | 180/89.14 |
| 2020/0189667 A1* | 6/2020 | Wang ................... B62D 33/067 |

FOREIGN PATENT DOCUMENTS

| CN | 104386145 A   | * | 3/2015 | |
| EP | 0756986 A1    | * | 2/1997 | ........... B62D 33/067 |
| KR | 10-2002-0045464 A |   | 6/2002 | |
| KR | 100398433 B1  | * | 9/2003 | |
| WO | WO-0068063 A1 | * | 11/2000 | ........... B62D 33/067 |
| WO | WO-2012120534 A1 | * | 9/2012 | ............. B62D 33/07 |

* cited by examiner

*Primary Examiner* — Karen Beck
(74) *Attorney, Agent, or Firm* — Morgan, Lewis & Bockius LLP (57) ABSTRACT

A tilting pump apparatus includes a pump operation unit arranged between a mudguard, which is configured to obstruct foreign objects entering from a front side, and a tilting pump, which is configured to be rotated for generating hydraulic pressure to transmit movement of the mudguard generated by depressing the mudguard as rotational force for rotating the tilting pump.

19 Claims, 9 Drawing Sheets

DEPRESSION OPERATED TILTING PUMP APPARATUS AND CAB TILTING SYSTEM EMPLOYING THE PUMP APPARATUS

CROSS-REFERENCE TO RELATED APPLICATION

This application claims priority to Korean Patent Application No. 10-2019-0021944, filed on Feb. 25, 2019 in the Korean Intellectual Property Office, the disclosure of which is incorporated herein by reference in its entirety.

TECHNICAL FIELD

The present disclosure relates to a cab tilting apparatus, and more particularly, to a cab tilting system employing a tilting pump apparatus that is operated by foot depressing operation using a mudguard.

BACKGROUND

In general, a cabin (simply referred to as "cab") can be tilted by means of a cab tilting system whereby an engine room can be opened to the outside.

To this end, the cab tilting system comprises a tilting pump apparatus wherein the tilting pump apparatus is composed of: a tilting pump for supplying hydraulic pressure (or pneumatic pressure) that is connected, by a hydraulic line, to a cab tilting stay (or a tilting cylinder) for pushing the cab upward in a state where the cab is coupled to a vehicle frame; and a tilting bar for converting pumping force of the tilting pump to upward and downward reciprocating motion.

Therefore, the tilting pump apparatus composed of the tilting pump configured to be operated by means of operation of the tilting bar is characterized as a manual tilting pump apparatus.

Accordingly, when the tilting pump apparatus generates hydraulic pressure which is generated by pumping force generated when the tilting bar is grasped by a hand after the tilting bar is pulled out from a storage space inside a front panel and connected to the tilting pump and then the tilting bar is forced to reciprocate upward and downward by the hand, the cab tilting system can be operated by the hydraulic pressure of the tilting pump to allow the cab to be opened and tilted.

SUMMARY OF THE DISCLOSURE

In the conventional tilting pump apparatus, however, since the tilting bar is kept separated from the tilting pump, improvements in handling are demanded with respect to the following points:

First, hassle of pre-work for operating the tilting pump, which is caused because the tilting bar is received inside the front panel of a vehicle so that in order to tilt the cab, and thus, it is necessary to locate and pull out the tilting bar after opening the door and then opening the front panel by releasing locking of the front panel.

Second, difficulty in operating the tilting pump; this is caused because it is required to manually reciprocate the tilting bar connected to the tilting pump upward and downward in order to operate the tilting pump.

Third, inconvenience in using tools for operating the tilting pump; this is caused because it is not only impossible to operate the tilting pump when the tilting bar is lost but also difficulty in tilting the cab is weighted because of excessive working effort due to short length of the tilting bar.

Therefore, the present disclosure has been made in effort to solve problems as described above. An object of the present disclosure is to provide a depression operated tilting pump apparatus configured such that the pump apparatus is easily stored and handled by integrating a stay rod and the tilting pump with each other using a mudguard, particularly the stay rod operates the tilting pump when the mudguard is depressed by a foot so that hassle, difficulty and inconveniences in operating the tilting pump are all solved. In addition, it is also to provide a cab tilting system employing the tilting pump apparatus.

Other objects and advantages of the present disclosure can be understood by the following description and become apparent with reference to the embodiments of the present disclosure. It is obvious to those skilled in the art to which the present disclosure pertains that the objects and advantages of the present disclosure can be realized by the means as claimed and combinations thereof.

In accordance with an exemplary embodiment of the present disclosure, a tilting pump apparatus comprises a pump operation unit arranged between a mudguard, which is configured to cover a front side of a tire to obstruct foreign objects entering from the front, and a tilting pump, which is configured to be rotated for generating hydraulic pressure to transmit movement of the mudguard generated by depressing the mudguard as rotational force for rotating the tilting pump.

The mudguard is formed with an operation groove for allowing the mudguard to be depressed.

The pump operation unit comprises a stay member composed of a fixed stay rod and a movable stay rod which are coupled to each other wherein the movable stay rod forms a moment length by allowing its length to be adjusted with respect to the fixed stay rod and the movable stay rod transmits rotational force to the tilting pump by being rotated by the moment length according to movement of the mudguard.

The rotation by the moment length is angular movement of the movable stay rod.

A spring stopper and a stay hinge pin are coupled to the stationary stay rod in such a manner that the spring stopper and the stay hinge pin are spaced apart from each other; the movable stay rod is formed with a rotation guide in which the stay hinge pin to be shifted by adjustment of the length is seated and a pin channel in which the spring stopper to be shifted by adjustment of the length is caught and restrained; and distances of the rotation guide and the pin channel are formed as the moment length respectively.

The rotation guide is formed in an arc shape taking the moment length as its radius to allow the movable stay rod to rotate. In addition, the pin channel is formed as a straight section.

The movable stay rod is provided at a portion of the pin channel with a pump holder and the pump holder encloses a pump shaft of the tilting pump. Particularly, the pump holder and the pump shaft have a square cross-sectional shape, respectively.

The tilting pump is coupled to the fixed stay rod.

The movable stay rod is provided with an operation plate for pushing or pulling the movable stay rod for adjustment of the length.

The pump operation unit comprises a restoring spring fixed to the fixed stay rod and the movable stay rod respectively such that it is compressed by rotation of the movable stay rod wherein resilient restoring force by compression of the restoring spring is applied so as to return the movable stay rod to its initial position.

Further, in accordance with another exemplary embodiment of the present disclosure, a cab tilting system comprises: a mudguard covering a front side of a tire; a tilting pump for generating hydraulic pressure for tilting a cab; and a tilting pump apparatus including a fixed stay rod to which the tilting pump is coupled and a movable stay rod to which the mudguard is coupled, wherein the fixed stay rod and the movable stay rod are coupled in such a manner that length therebetween is adjusted with respect to each other, and wherein a moment length of the movable stay rod by adjustment of the length between the fixed stay rod and the movable stay rod allows the movable stay rod to be rotated by depression force of the mudguard and allows rotation of the movable stay rod to be transmitted by rotational force of the tilting pump.

Coupling between the fixed stay rod and the movable stay rod is made in such a manner that the fixed stay rod is enclosed by the movable stay rod and the length adjustment is made by slidably moving the movable stay rod with respect to the fixed stay rod. Particularly, the fixed stay rod is fixed to a vehicle frame to which the cab is hinged and the movable stay rod is fixed to the mudguard via a stay bracket.

A spring stopper and a stay hinge pin which are coupled to the stationary stay rod in such a manner that the spring stopper and the stay hinge pin are spaced apart from each other and a rotation guide in which the stay hinge pin is seated and a pin channel in which the spring stopper is caught and restrained, which are formed in the movable stay rod, allow the length adjustment to be performed wherein distances of the rotation guide and the pin channel are formed as the moment length respectively. Particularly, the spring stopper comprises right and left stopper pins fixed to both ends of a pin connection spring respectively.

The tilting pump apparatus comprises a restoring spring wherein the restoring spring is resiliently supported by fixing both ends thereof to a spring holder pin of the fixed stay rod and a spring hook of the movable stay rod respectively.

With the tilting pump apparatus applied to the vehicle cab tilting system according to the present disclosure, the following actions and effects are realized by depression operation using a mudguard:

First, since manual operation of the tilting pump is performed by a foot rather than a hand, tilting the cab can be performed even with a small effort on the tilting pump. Second, it is not required to form a front panel structure for storing and locating a tilting bar for operating the tilting pump. Third, the integrated type tilting pump system can eliminate all of hassle of pre-work, difficulty of operation and inconvenience in using a tool compared to the separated type tilting pump system. Fourth, merchantability of the vehicle cab tilting system can be greatly increased in spite of using a manual tilting pump apparatus.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Exemplary embodiments of the present disclosure will be described below in detail with reference to the accompanying drawings. Since these embodiments described herein by way of example may be implemented in many different forms by those of ordinary skill in the field of art to which the present disclosure pertains, the present disclosure is not limited thereto.

Figure 1:
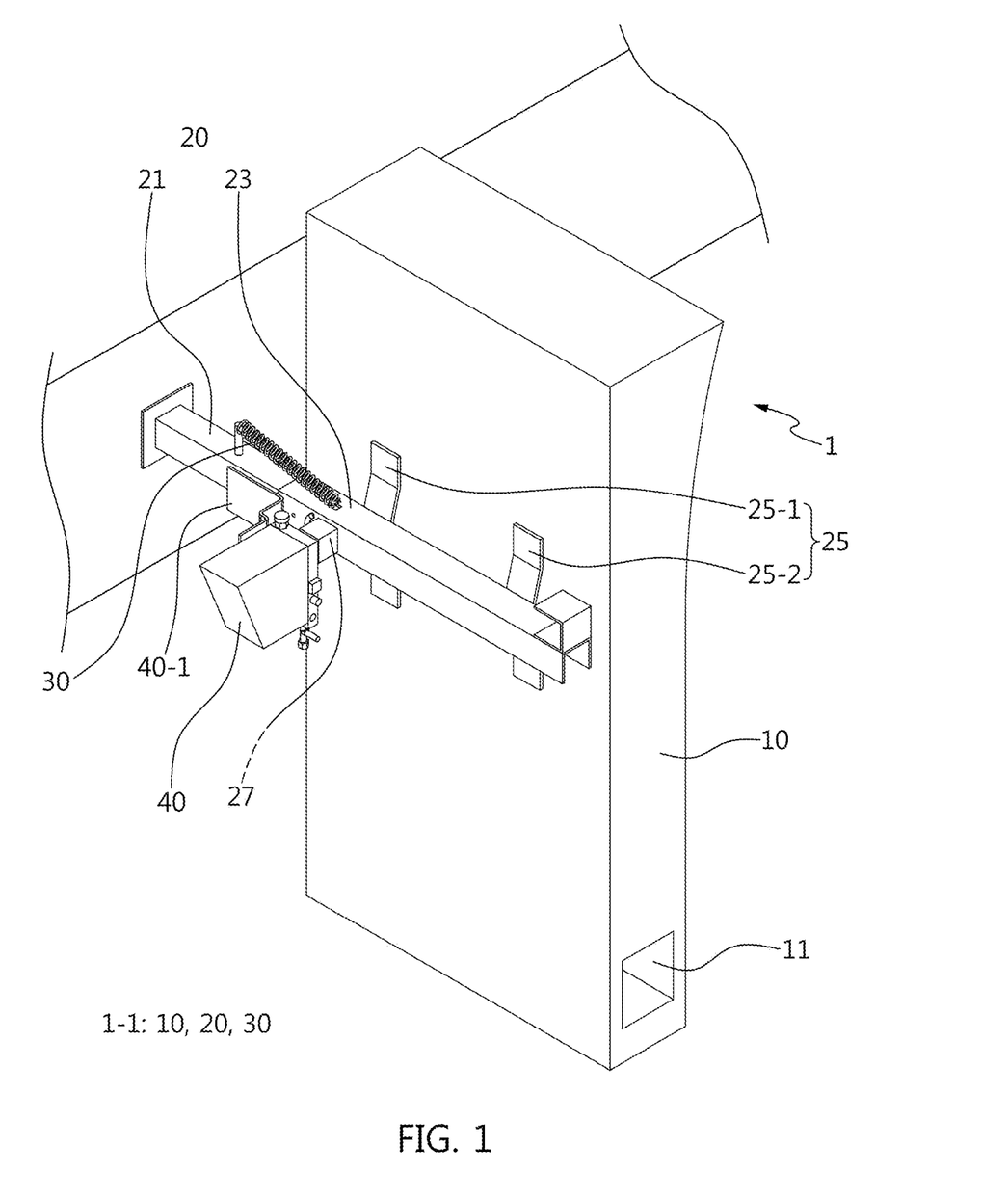
FIG. 1 is a view showing an assembled constitution of a depression operated tilting pump apparatus according to an exemplary embodiment of the present disclosure.

Referring to FIG. 1, a tilting pump apparatus 1 comprises a pump operation unit 1-1 and a tilting pump 40 for generating hydraulic pressure. Particularly, the tilting pump apparatus 1 is characterized as a depression operated tilting pump apparatus because the pump operation unit 1-1 is configured such that upward and downward reciprocating motion of a mudguard 10 is converted into rotational force of the tilting pump 40 by means of stay rods 21 and 23.

Specifically, the pump operation unit 1-1 is composed of the mudguard 10, a stay member 20 and a restoring spring 30.

For example, the mudguard 10 is made of a metal plate so as to maintain rigidity against external depression by a driver and formed in a rectangular shape to cover the front of a tire so as to obstruct clay or cobbles. Particularly, the mudguard 10 is formed in a box shape opened toward the tire, of which one side is formed with an operation groove 11. In this case, the operation groove 11 provides a place where an operation means 200 (see FIG. 7) for depressing the mudguard 10 is arranged wherein a foot of a driver is put on the operation means 200.

Accordingly, the mudguard 10 makes it possible to provide rotational force for generating hydraulic pressure of the tilting pump 40, thereby greatly reducing consumption of effort force of the driver for operating the tilting pump 40.

For example, the stay member 20 is configured such that rotational force is imparted to the tilting pump 40 by means of the mud guard 10 which is lowering down against resilient restoring force of the restoring spring 30 by external force applied through the operation groove 11. To this end, the stay member 20 is composed of a fixed stay rod 21 and a movable stay rod 23 which are coupled to each other so as to allow slidable movement, a stay bracket 25 for fixing the movable stay rod 23 to the mudguard 10, and a sliding member including a spring stopper 27 for limiting moving distance of the movable stay rod 23 (see a stay hinge pin 28 and an operation plate 29 in FIG. 2).

For example, the restoring spring 30 is resiliently supported by fixing both ends thereof to the fixed stay rod 21 and the movable stay rod 23 respectively, thereby generating resilient force pulling the movable stay rod 23 in an assembled state.

Figure 2:
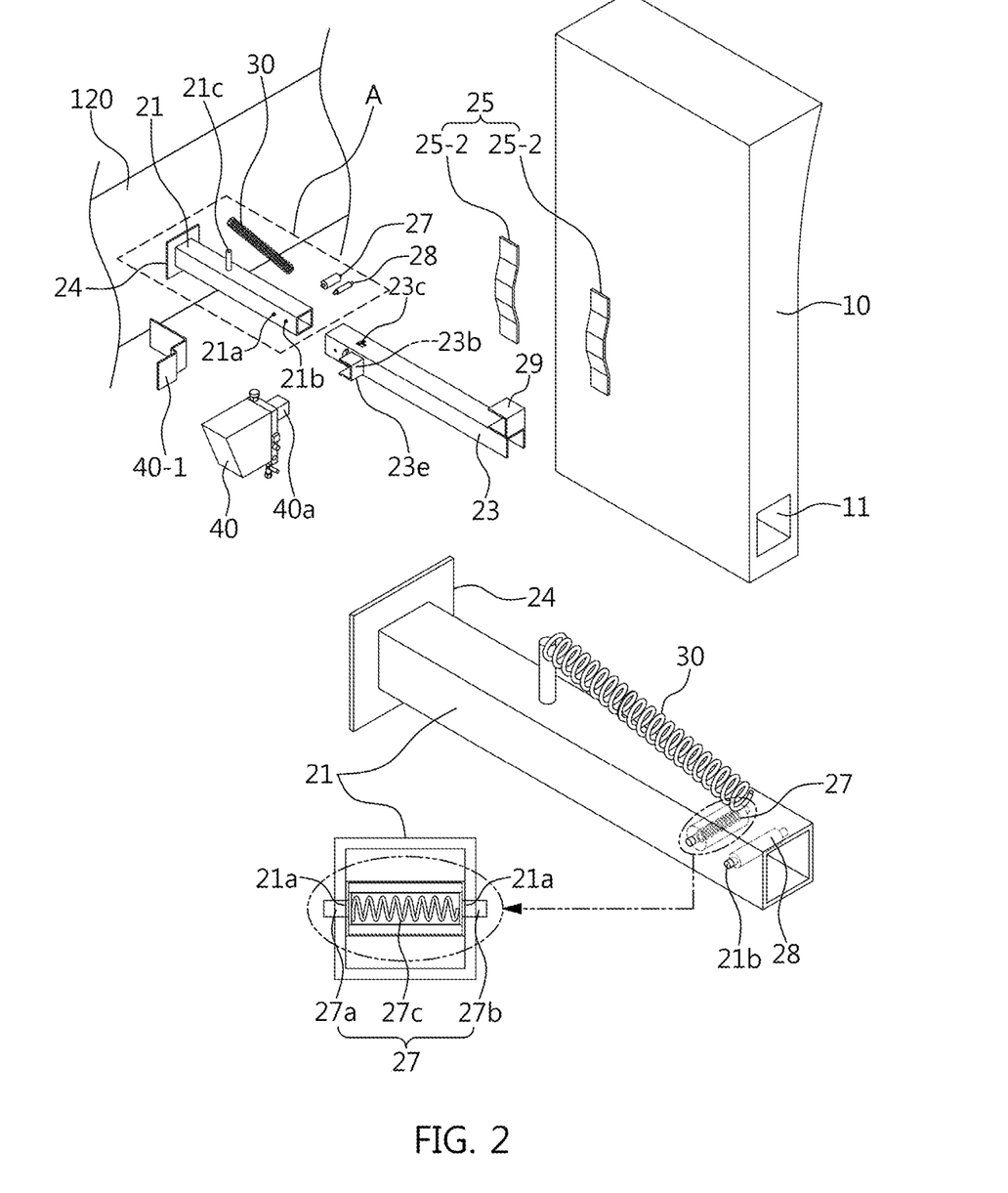
FIG. 2 is a view showing an exploded constitution of a depression operated tilting pump apparatus according to an exemplary embodiment of the present disclosure.
Figure 3:
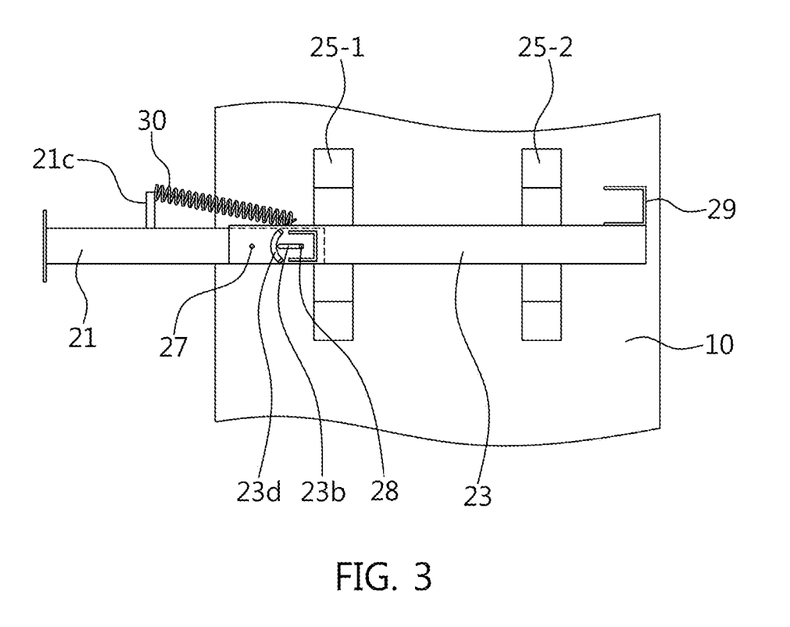
FIG. 3 is a view showing an assembled state of a pump operation unit according to an exemplary embodiment of the present disclosure.
Figure 4:
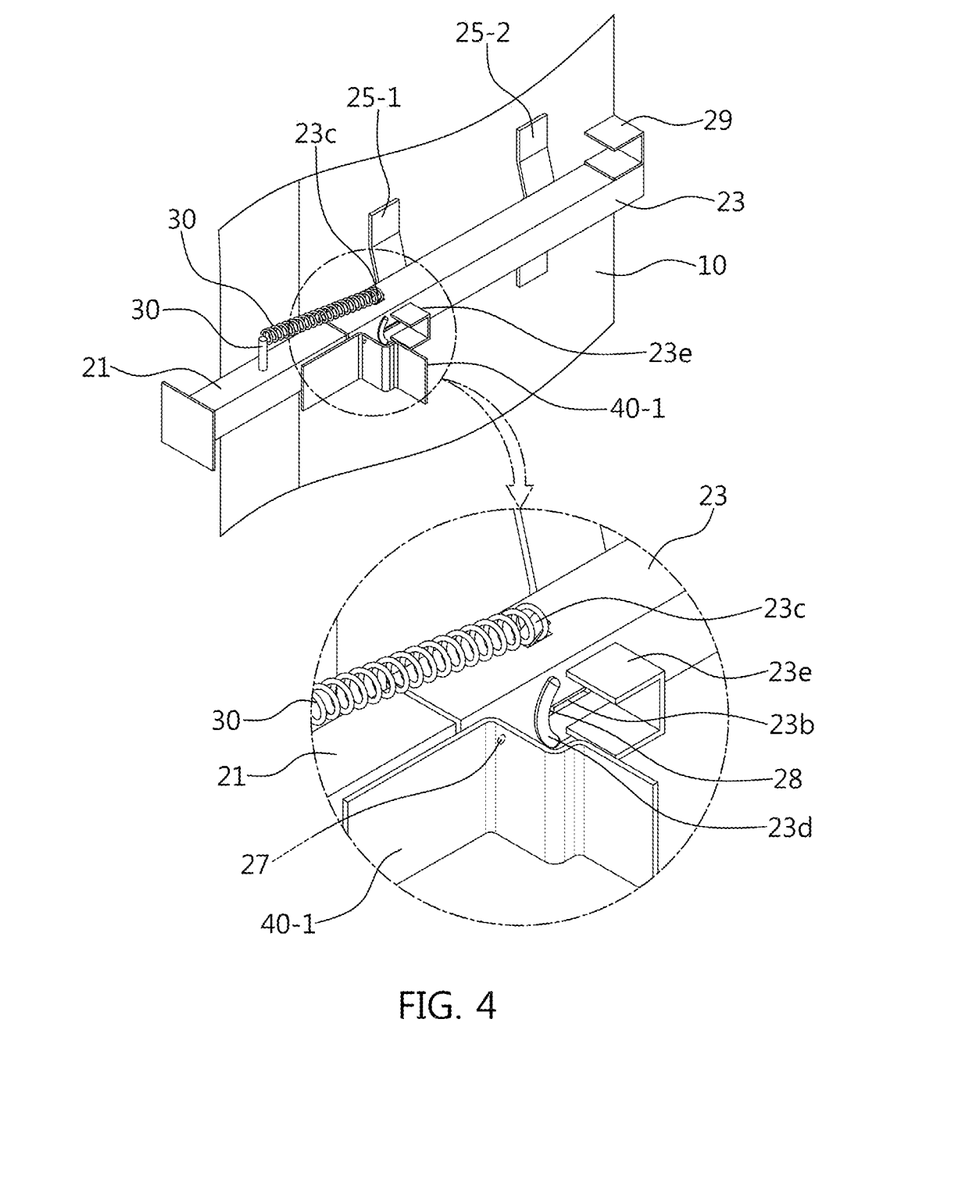
FIG. 4 is a view showing an assembled state of a pump operation unit and a tilting pump according to an exemplary embodiment of the present disclosure.

On the other hand, FIGS. 2 to 4 illustrate detailed structure of the stay member 20 and the restoring spring 30 which constitute the pump operation unit 1-1.

Referring to FIG. 2, the stay member 20 is composed of the fixed stay rod 21, the movable stay rod 23, the stay bracket 25 and the sliding member.

Specifically, the stationary stay rod 21 is in a fixed state and formed to have a square shape to be inserted into the movable stay rod 23. The movable stay rod 23 is formed in a "U" shaped configuration opened toward one side so as to form a slidable coupling structure for allowing it to move and rotate with respect to the fixed stay rod 21 (that is, angular movement) in a state of enclosing the fixed stay rod 21.

Particularly, the fixed stay rod 21 is provided with a spring holder pin 21c for allowing one end of the restoring spring 30 to be fixed thereto and a fixing plate 21f welded or bolt fastened to a vehicle frame 120 to secure fixing force of the fixing stay rod 21. Moreover, the movable stay rod 23 is provided with a spring hook 23c for allowing the opposite end (that is, the other end which is not fixed to the spring holder pin 21c) of the restoring spring 30 to be fixed thereto.

Specifically, the stay bracket 25 is welded or screw fastened onto a surface of the mudguard 10 covering the tire to secure fixing force of the movable stay rod 23. Particularly, the stay bracket 25 is composed of a left stay bracket 25-1 and a right stay bracket 25-2 which are spaced apart from each other.

Specifically, the sliding member is composed of a spring stopper 27, a stay hinge pin 28, and an operation plate 29.

For example, the spring stopper 27 is engaged with a stopper hole 23a of the movable stay rod 23 in a state where it is inserted into a stopper hole 21a in the inner space of the fixed stay rod 21 and protruded. Further, the spring stopper 27 is located in an arc shaped rotation guide 23d which forms a rotational radius of the movable stay rod 23 when the movable stay rod 23 is moved and then rotated. To this end, the spring stopper 27 is composed of right and left stopper pins 27a and 27b fixed to both ends of a pin connection spring 27c respectively. Particularly, each of the right and left stopper pins 27a and 27b is formed with a ball shaped end portion so as to mitigate frictional resistance generated when they are forced to enter the stopper hole 21a in a state of being inserted into the stopper hole 21a by pressing force generated by movement of the movable stay rod 23.

For example, the stay hinge pin 28 is inserted into the pin hole 21b in the inner space of the fixed stay rod 21, which will be positioned in the pin channel 23b of the movable stay rod 23 when the movable stay rod 23 is moved. To this end, the stay hinge pin 28 is formed in a cylindrical shape.

For example, the operation plate 29 is formed in a shape configured to allow the movable stay rod 23 to be grasped and pulled or pushed by hand from the outside so as to return the movable stay rod to its initial position.

To this end, the operation plate 29 is protruded in a state of being fixed to one end of the movable stay rod 23 by welding or screw fastening.

Specifically, the restoring spring 30 is resiliently supported by fixing both ends thereof to the spring holder pin 21c of the fixed stay rod 21 and the spring hook 23c of the movable stay rod 23 respectively. Therefore, the restoring spring 30 continuously pulls the movable stay rod 23 in a state where it is resiliently supported, and as a result, imparts resilient restoring force to the movable stay rod 23 when the movable stay rod 23 is returned to its initial position after the movable stay rod 23 is moved and rotated (angular movement). To this end, the restoring spring 30 is configured as a coil spring.

Referring to FIG. 3, operation of the spring stopper 27 and the stay hinge pin 28 is illustrated.

Specifically, the spring stopper 27 is forced to enter the stopper hole 21a by pressurization force caused by movement of the movable stay rod 23, thereby allowing the movable stay rod 23 to move with respect to the fixed stay rod 21 and at the same time limiting moving distance of the movable stay rod 23 so as not to move beyond its initial position when returning.

Further, the spring stopper 27 is located in the arc shaped rotation guide 23d which forms a rotational radius of the movable stay rod 23 when the movable stay rod 23 is moved and then rotated, thereby supporting rotation of the movable stay rod 23 stably. To this end, the rotation guide 23d is configured as a protruding structure such that the right and left stopper pins 27a and 27b of the spring stopper 27 are seated therein in a protruded state.

Specifically, the stay hinge pin 28 acts as a rotating shaft when the movable stay rod 23 is rotated with respect to the fixed stay rod 21 (i.e., angular movement) at the end position of the pin channel 23b. In this case, the pin channel 23b is formed as a straight section.

Therefore, a channel distance of the pin channel 23b with respect to the rotation guide 23d becomes a moving length enabling movement of the movable stay rod 23 and at the same time becomes a moment length by which rotation moment for forming rotation angle when the movable stay rod 23 rotates is generated.

Particularly, the moment length forms a radius of the arc shaped rotation guide 23d. Therefore, the channel distance for determining the moment length can be varied in various ways depending on magnitude of rotation angle of the movable stay rod 23.

Referring to FIGS. 2 and 4, the tilting pump 40 includes a pump shaft 40a wherein the pump shaft 40a is rotated in a direction of rotation of the movable stay rod 23 together when the movable stay rod 23 is rotated after being moved, thereby generating hydraulic pressure. To this end, the pump shaft 40a is engaged with a pump holder 23e provided at the end of the pin channel 23b on the opposite side of the rotation guide 23d of the movable stay rod 23. Particularly, the pump holder 23e and the pump shaft 40a are formed to have a square cross-sectional shape so that the pump shaft 40a is enclosed by the pump holder 23e and thus the pump holder 23e stably transfers rotational force of the movable stay rod 23 to the pump shaft 40a.

Further, the tilting pump 40 is welded to the pump bracket 40-1 and the pump bracket 40-1 is fixed to a side face of the stationary stay rod 21 by welding or screw fastening.

Figure 5:
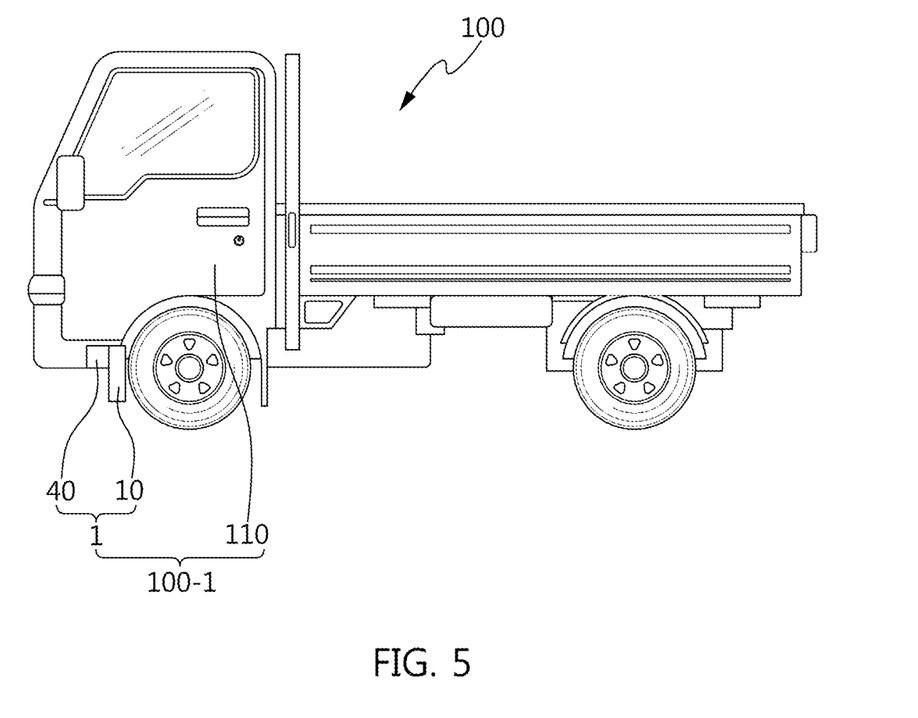
FIG. 5 is view showing an example of a vehicle equipped with a cab tilting system employing a depression operated tilting pump apparatus according to an exemplary embodiment of the present disclosure.

On the other hand, FIG. 5 shows a vehicle 100 equipped with a cab tilting system 100-1 in which tilting is performed by the tilting pump apparatus 1 which is operated in a depression operated manner through the mudguard 10. As shown in the figure, the vehicle 100 comprises a cab 110 forming a driver's compartment and the cab tilting system 100-1 including the tilting pump apparatus 1 for tilting the cab 110.

Specifically, the tilting pump apparatus 1 is the same as the depression operated tilting pump apparatus 1 as described with reference to FIGS. 1 to 4. Therefore, the tilting pump apparatus 1 is arranged in front of the tire such that the mudguard 10 partially covers the tire of the vehicle 100 while the fixed stay rod 21 of the stay member 20 is fixed to the vehicle frame 120 through the fixing plate 21f by welding or bolt fastening.

Specifically, the cab 110 is formed with a hinge joint portion hinged to the vehicle frame 120 so that the cab can be turned forward about the hinge joint portion as its rotation axis when it is tilted. In this case, the hinge joint portion has a conventional structure.

On the other hand, FIGS. 6 to 9 show an example in which tilting the cab is performed by hydraulic pressure of the tilting pump 40, which is caused by the pump operation unit 1-1 for operating the tilting pump apparatus 1 in the depression operated manner.

Figure 6:
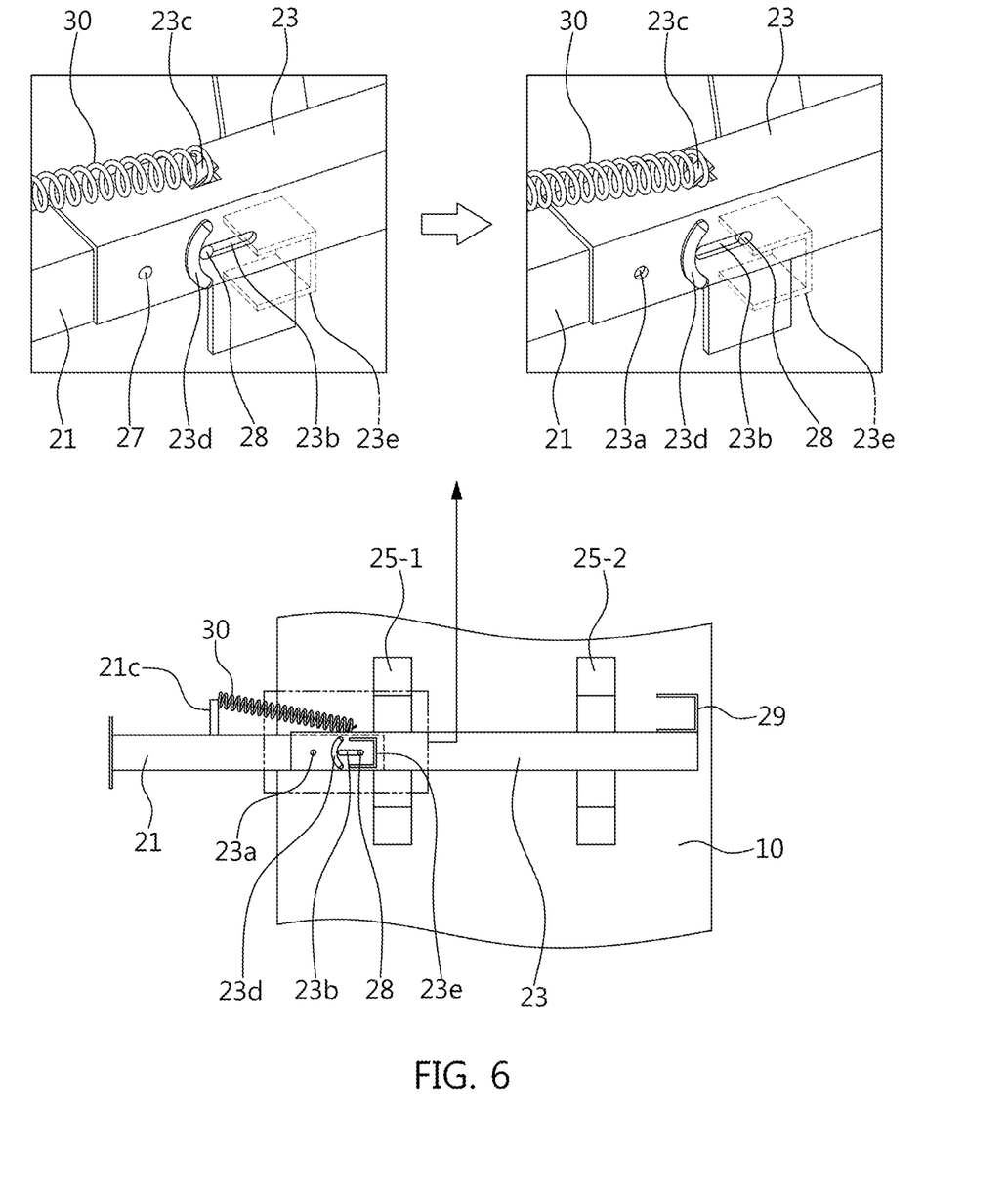
FIG. 6 shows an example in which a movable stay of a pump operation unit is pushed toward a fixed stay such that the movable stay is changed into a rotatable state in order to operate a depression operated tilting pump apparatus according to an exemplary embodiment of the present disclosure.

Reference is made to FIG. 6 showing an example in which the movable stay 23 of the pump operation unit 1-1 is pushed toward the fixed stay 21 such that the movable stay 23 is changed into a rotatable state in order to operate the tilting pump apparatus 1.

As shown in the figure, when pushing the operation plate 29 provided on the movable stay rod 23 toward the fixed stay rod 23, the movable stay rod 23 is moved toward the fixed stay rod 23 while the right and left stopper pins 27a and 27b of the spring stopper 27 are inserted into the stopper hole 21a. In this case, operation of the movable stay rod 23 is stopped after the hinge pin 28 is moved along the pin channel 23b and then reaches the end position of the pin channel.

Then, when movement of the movable stay rod 23 is completed, the right and left stopper pins 27a and 27b of the spring stopper 27 are located in the rotation guide 23d formed in the movable stay rod 23 and at the same time the stay hinge pin 28 is located at the end position of the pin channel 23b formed in the movable stay rod 23.

As a result, the movable stay rod 23 is converted into a state in which it can be rotated about the stay hinge pin 28 as its rotation axis within the rotation angle generated by the moment length corresponding to the length of each of the rotation guide 23d and the pin channel 23b.

Further, the restoring spring 30 is compressed by the shortened movement length of the movable stay rod 23, thereby providing resilient restoring force when the movable stay rod 23 is returned to its initial position.

Figure 7:
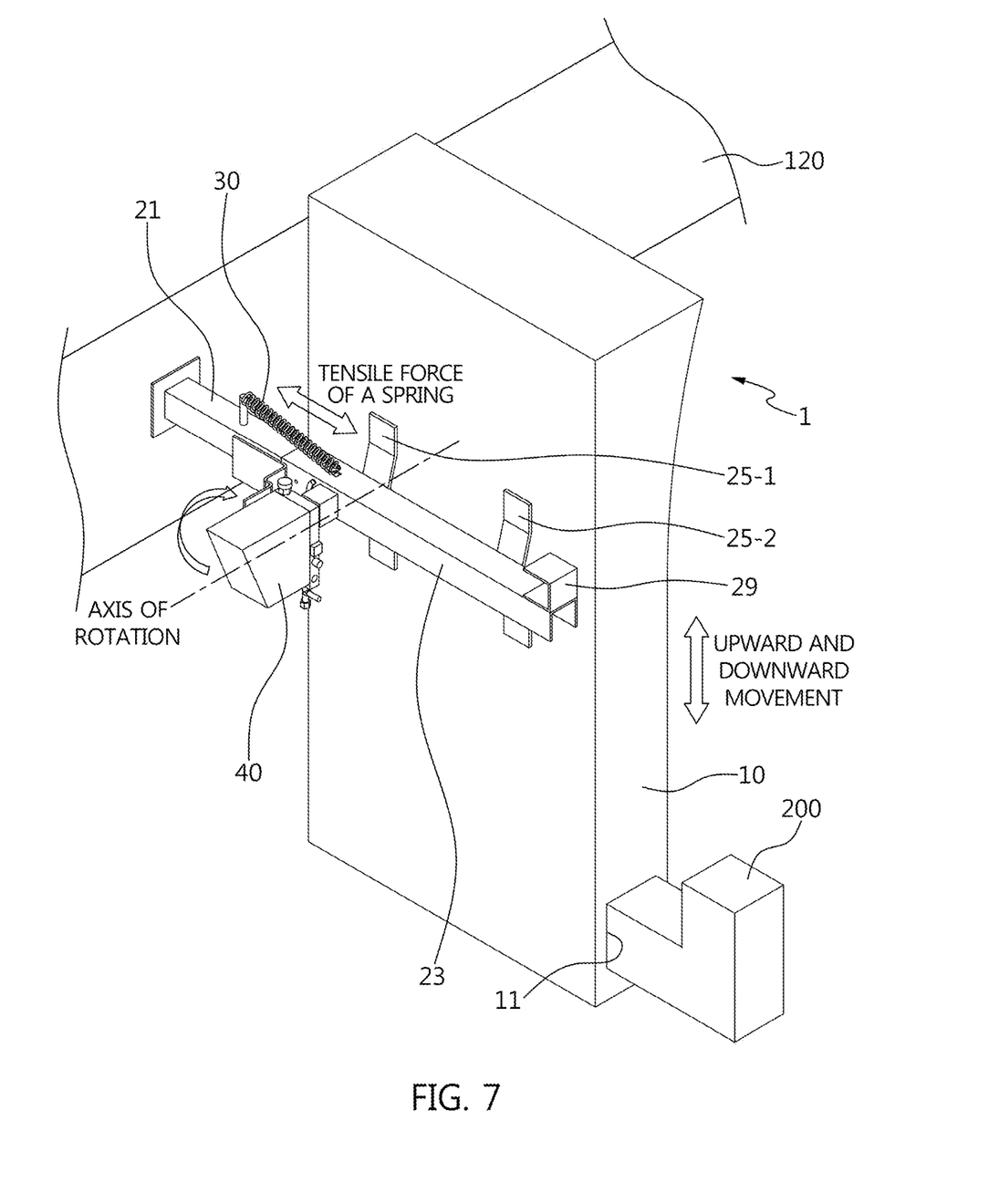
FIG. 7 shows an initial operation state in which a mud guard is depressed by a foot such that rotation of a movable stay is transmitted to a tilting pump in accordance with an exemplary embodiment of the present disclosure.
Figure 8:
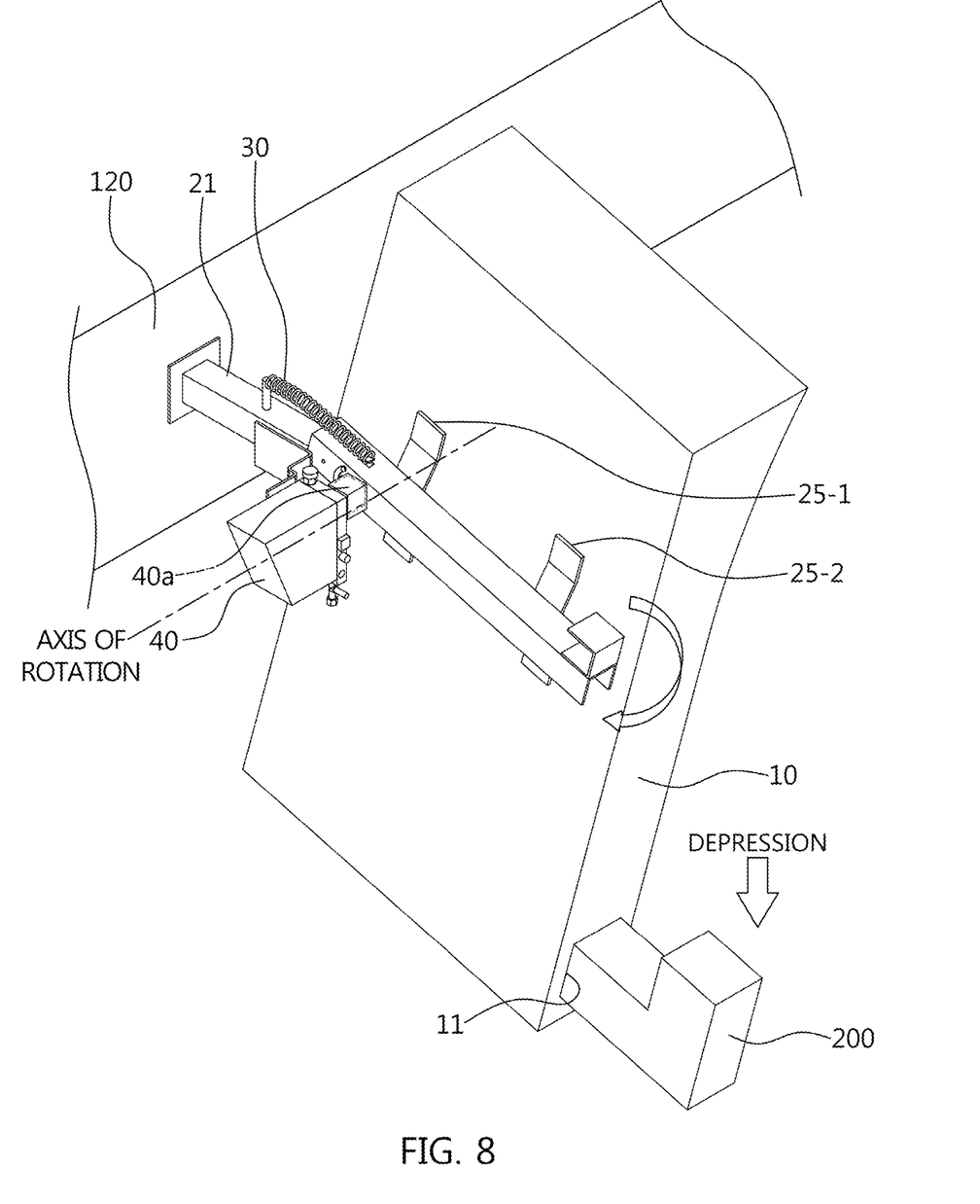
FIG. 8 shows a progressive operation state in which a mudguard is in the process of being depressed strongly by a foot such that hydraulic pressure is generated in a tilting pump by means of strong rotation of a movable stay in accordance with an exemplary embodiment of the present disclosure.

Next, reference is made to FIGS. 7 and 8 illustrating an initial operation state in which the mudguard 10 is depressed by a foot whereby rotation of the movable stay 23 is transmitted to the tilting pump 30.

As shown in FIG. 7, the mudguard 10 is moved downward (that is, moved to a position toward the ground) by depression force applied through the operation groove 11 by the operation means 200 and at the same time the movable stay rod 23 is rotated about the hinge pin 28 as its rotation axis. In this case, a foot of the driver is put on the operation means 200.

As shown in FIG. 8, rotation of the movable stay rod 23 rotates the pump shaft 40a through the rotation guide 23d and rotation of the pump shaft 40a causes the tilting pump 40 to operate so that the tilting pump 40 generates hydraulic pressure.

As a result, hydraulic pressure of the tilting pump 40 is transmitted to the cab 110 of the cab tilting system 100-1 and in turn the cab 110 is tilted about the hinge joint portion of the vehicle frame 120.

Further, the restoring spring 30 comes into a tensioned state due to downward movement of the movable stay rod 23 according to downward movement of the mudguard 10 against the compressed state due to movement of the movable stay rod 23. Therefore, the restoring spring 30 provides the movable stay rod 23 which is moving upward (that is, moving to the initial position separated away from the ground) with resilient restoring force for returning the movable stay rod to its initial position when depression force of the operation means 200 pressing the mudguard 10 is released.

Figure 9:
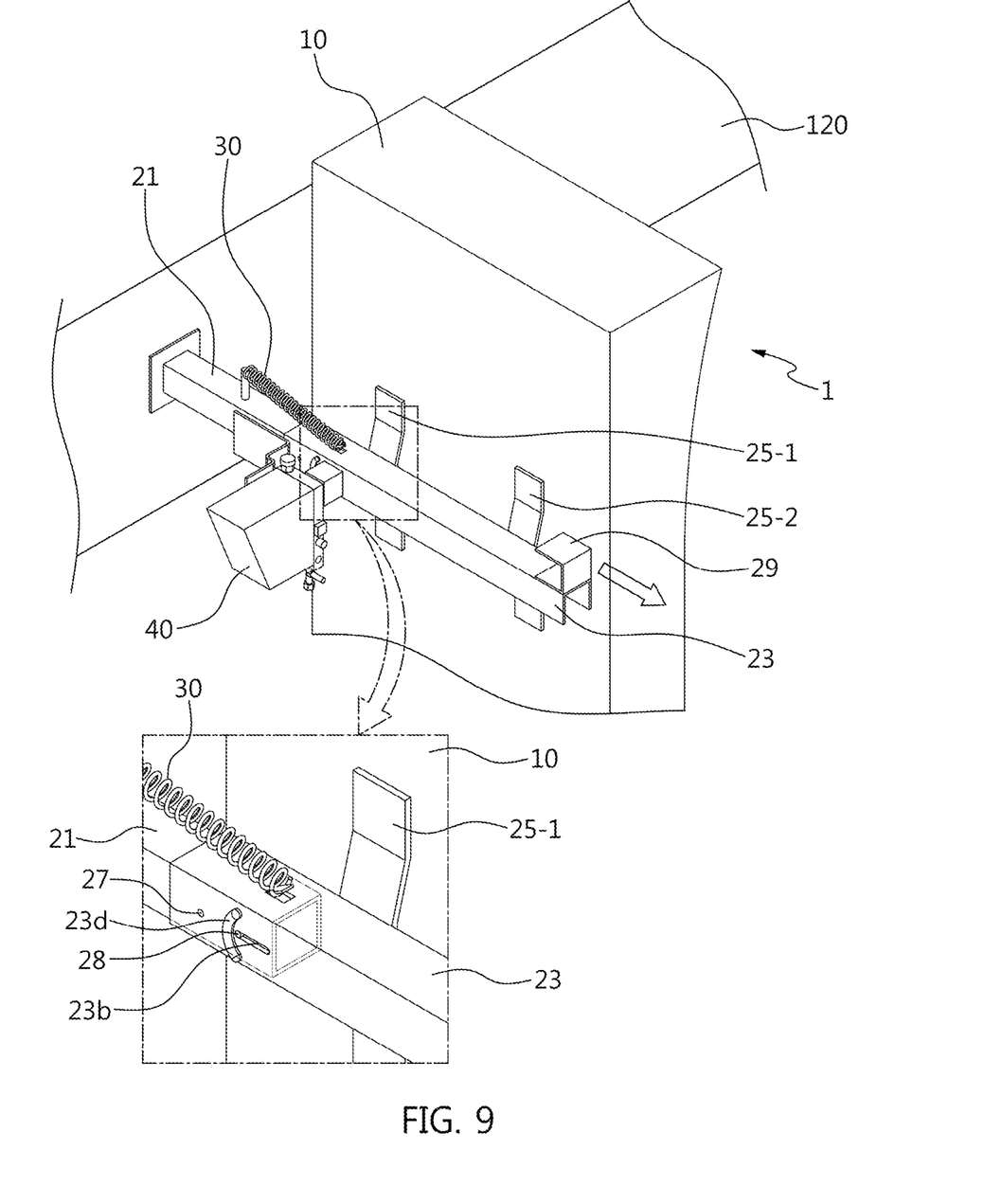
FIG. 9 shows a state in which a movable stay is pulled out after tilting pumping of a depression operated tilting pump apparatus according to an exemplary embodiment of the present disclosure is completed and then returned to a state of being fixed to a fixed stay.

Finally, reference is made to FIG. 9 illustrating an example in which the operation plate 29 is pulled to return the movable stay rod 23 to its initial position after the mudguard 10 is returned to its initial position due to release of depression force of the operation means 200 when tilting the cab 110 is completed.

As shown in the figure, the movable stay rod 23 is pulled through the operation plate 29 and in turn the stay hinge pin 28 is moved along the pin channel 23b and positioned into the rotation guide 23d and at the same time the spring stopper 27 also escapes from the rotation guide 23d and returns into the stopper hole 21a.

Then, the restoring spring 30 is released from the compressed state by the extended movement length of the movable stay rod 23 whereby it exerts resilient restoring force to the movable stay rod 23 being returned to the initial position, thereby contributing to returning movement of the movable stay rod.

As described above, the depression operated tilting pump apparatus 1 applied to the cab tilting system 100-1 according to an embodiment of the present disclosure comprises the pump operation unit 1-1 configured such that a fixed stay rod 21 to which a tilting pump 40 for generating hydraulic pressure is coupled and a movable stay rod 23 to which a mud guard 10 covering the front of a tire is coupled are coupled to each other so that length therebetween is adjusted with respect to each other wherein a moment length of the movable stay rod 23 to be formed by adjustment of the length allows the movable stay rod 23 to be rotated by depression force of the mudguard 10 and allows rotation of the movable stay rod to be transmitted as rotational force of the tilting pump 40. Therefore, the tilting pump apparatus is advantageous in that the tilting pump 40 and the stay rods 21 and 23 are integrated with each other through the mudguard 10 so that storage and handling of the tilting pump 40 are easy and particularly rotation of the stay rods 21 and 23 generated by upward and downward movement of the mudguard 10 by foot operation operates the tilting pump so that hassle, difficulty and inconvenience in operating the tilting pump are all solved.

Although the present disclosure has been described in the foregoing with reference to the drawings illustrated by way of example, the present disclosure is not limited to the disclosed embodiments, and it will be apparent to those of ordinary skill in the art that various modifications and variations can be made to the present disclosure without departing from the spirit and scope of the disclosure. Therefore, such modifications or variations fall within the scope of the present disclosure as claimed and the scope of the present disclosure should be interpreted based on the appended claims.

What is claimed is:

1. A tilting pump apparatus comprising:
a pump operation unit comprising a stay member including a fixed stay rod and a movable stay rod which are coupled to each other, and
wherein the movable stay rod has a moment length by allowing a length of the movable stay rod to be adjusted with respect to the fixed stay rod, and the movable stay rod transmits rotational force to a tilting pump by being rotated by the moment length according to movement of a mudguard, and
wherein the stay member is arranged between the mudguard, which is configured to obstruct foreign objects entering from a front side of a tire, and the tilting pump, which is configured to be rotated by depressing the mudguard as the rotational force so as to generate hydraulic pressure.

2. The tilting pump apparatus according to claim 1, wherein the mudguard is provided with an operation groove for allowing the mudguard to be depressed.

3. The tilting pump apparatus according to claim 1, wherein the rotation by the moment length is an angular movement of the movable stay rod.

4. The tilting pump apparatus according to claim 1, wherein a spring stopper and a stay hinge pin are coupled to the fixed stay rod in such a manner that the spring stopper and the stay hinge pin are spaced apart from each other,
wherein the movable stay rod includes a rotation guide in which the stay hinge pin to be shifted by adjustment of the length of the movable stay rod is seated and a pin channel in which the spring stopper to be shifted by adjustment of the length is caught and restrained, and
wherein a distance between the rotation guide and the pin channel arechannel is the moment length.

5. The tilting pump apparatus according to claim 4, wherein the rotation guide has an arc shape to allow the movable stay rod to rotate.

6. The tilting pump apparatus according to claim 5, wherein the arc shape is a rotational radius of the movable stay rod.

7. The tilting pump apparatus according to claim 4, wherein the pin channel has a straight section.

8. The tilting pump apparatus according to claim 4, wherein the movable stay rod is disposed at a portion of the pin channel with a pump holder, and wherein the pump holder encloses a pump shaft of the tilting pump.

9. The tilting pump apparatus according to claim 8, wherein each of the pump holder and the pump shaft has a square cross-sectional shape.

10. The tilting pump apparatus according to claim 8, wherein the tilting pump is coupled to the fixed stay rod.

11. The tilting pump apparatus according to claim 4, wherein the movable stay rod is provided with an operation plate for pushing or pulling the movable stay rod for adjustment of the length of the movable stay rod.

12. The tilting pump apparatus according to claim 1, wherein the pump operation unit comprises a restoring spring configured to be compressed by rotation of the movable stay rod, and
resilient restoring force by compression of the restoring spring is applied so as to return the movable stay rod to its initial position.

13. The tilting pump apparatus according to claim 12, wherein the restoring spring is fixed to the fixed stay rod and the movable stay rod.

14. A cab tilting system comprising:
a mudguard covering a front side of a tire;
a tilting pump for generating hydraulic pressure for tilting a cab; and
a tilting pump apparatus including:
a fixed stay rod to which the tilting pump is coupled; and
a movable stay rod to which the mudguard is coupled,
wherein the fixed stay rod and the movable stay rod are coupled in such a manner that a length therebetween is adjusted with respect to each other, and
wherein a moment length of the movable stay rod by adjustment of the length between the fixed stay rod and the movable stay rod allows the movable stay rod to be rotated by depression force of the mudguard and allows rotation of the movable stay rod to be transmitted by rotational force of the tilting pump.

15. The cab tilting system according to claim 14, wherein coupling between the fixed stay rod and the movable stay rod is made in such a manner that the fixed stay rod is enclosed by the movable stay rod and the length adjustment is made by slidably moving the movable stay rod with respect to the fixed stay rod.

16. The cab tilting system according to claim 14, wherein the fixed stay rod is fixed to a vehicle frame to which the cab is hinged and the movable stay rod is fixed to the mudguard via a stay bracket.

17. The cab tilting system according to claim 14, wherein a spring stopper and a stay hinge pin are coupled to the fixed stay rod in such a manner that the spring stopper and the stay hinge pin are spaced apart from each other and a rotation guide in which the stay hinge pin is seated and a pin channel in which the spring stopper is caught and restrained,
wherein the spring stopper and the stay hinge pin are formed in the movable stay rod, allow the length adjustment to be performed, and
wherein a distance between the rotation guide and the pin channel is the moment length.

18. The cab tilting system according to claim 17, wherein the spring stopper comprises right and left stopper pins fixed to both ends of a pin connection spring, respectively.

19. The cab tilting system according to claim 14, wherein the tilting pump apparatus comprises a restoring spring, and
wherein the restoring spring is resiliently supported by fixing both ends thereof to a spring holder pin of the fixed stay rod and a spring hook of the movable stay rod, respectively.

* * * * *